(12) United States Patent
Paatero et al.

(10) Patent No.: US 7,418,593 B2
(45) Date of Patent: Aug. 26, 2008

(54) METHOD AND A SYSTEM FOR PERFORMING TESTING IN A DEVICE, AND A DEVICE

(75) Inventors: Lauri Paatero, Helsinki (FI); Antti Kiiveri, Oulu (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 10/771,164

(22) Filed: Feb. 3, 2004

(65) Prior Publication Data

US 2004/0255117 A1 Dec. 16, 2004

(30) Foreign Application Priority Data

Feb. 3, 2003 (FI) ................................. 20030156

(51) Int. Cl.
*H04L 9/00* (2006.01)
(52) U.S. Cl. ...................................... 713/166; 713/150
(58) Field of Classification Search ................. 711/164; 713/166, 150, 164
See application file for complete search history.

(56) References Cited

U.S. PATENT DOCUMENTS

| 4,104,721 | A | * | 8/1978 | Markstein et al. | ........... 711/164 |
| 5,014,191 | A | | 5/1991 | Padgaonkar et al. | ........ 364/200 |
| 5,237,616 | A | | 8/1993 | Abraham et al. | ............... 380/49 |
| 2002/0175698 | A1 | | 11/2002 | Goodman | ....................... 326/8 |

FOREIGN PATENT DOCUMENTS

| EP | 1217850 | 6/2002 |
| JP | 2002341956 | 11/2002 |
| WO | 2004015553 | 2/2004 |

OTHER PUBLICATIONS

Distributed Authentication and Key Agreement Protocol for Ad hoc network Yijun Mo; Fei Wang; Ben Xiong Huang; Shuhua Xu; Advanced Communication Technology, The 9th International Conference on vol. 3, Feb. 12-14, 2007 pp. 2047-2050.*
A New Public Key Multi-Message Dynamic Signcryption (PK-MM-DS) Scheme for Cryptographic Transmission Elkamchouchi, H.M.; Emarah, A-A.M.; Hagras, E.A.A.; Radio Science Conference, 2007. NRSC 2007. National Mar. 13-15, 2007 pp. 1-10.*
Supervising secret-key agreements in a level-based hierarchy Ching-Te Wang; Chu-Hsing Lin; Chin-Chen Chang; Advanced Information Networking and Applications, 2004. AINA 2004. 18th International Conference on vol. 1, 2004 pp. 309-314 vol. 1.*
Patent Abstracts of Japan, translation of the Abstract only.

\* cited by examiner

*Primary Examiner*—David Jung (57) ABSTRACT

The present invention relates to a method and a system for performing testing in a device (1), in which at least one program (110, 112) is loaded and at least one item of mode data relating to the program is determined. Furthermore, at least one key (111) is generated for use in said program. In the method, at least two different security levels are determined for the keys to be used in the device (1). In the method, said security level determined for the key and at least one mode data relating to the program are examined, and on the basis of the examination, it is decided if said key is available for use in the mode indicated in the mode data of the program. The invention also relates to a device, a mobile communication device and a storage medium.

18 Claims, 5 Drawing Sheets

METHOD AND A SYSTEM FOR PERFORMING TESTING IN A DEVICE, AND A DEVICE

CROSS-REFERENCE TO RELATED APPLICATIONS

This application claims priority under 35 USC §119 to Finnish Patent Application No. 20030156 filed on Feb. 3, 2003.

FIELD OF THE INVENTION

The present invention relates to a method for performing testing in a device, wherein at least one program is loaded in the device, at least one item of mode data relating to the program is determined, and at least one key is formed for use in said program. The invention also relates to a system for performing testing in a device in which at least one program has been loaded, at least one item of mode data relating to the program has been arranged to be determined in the system, and the system has been provided with at least one key for use in said program. The invention also relates to a system comprising at least one processor for executing a program loaded in the device, at least one item of mode data relating to the program is arranged to be determined in the device, and the device has been provided with at least one key for use in said program. Furthermore, the invention relates to a storage medium in which a set of machine-executable program commands has been stored for performing testing in a device, in which device at least one program has been arranged to be loaded to be executed in the device, for which program at least one item of mode data has been determined, and at least one key has been formed for use in said program.

BACKGROUND OF THE INVENTION

There are known applications which can be used in the device after an access right has been acquired for the application. In systems of prior art, such an access right can be acquired, for example, in such a manner that the user loads an application via a data network into the device. In the same context, the user gives his/her contact data, wherein the application provider sends information necessary for opening the access right, for example via mail. The user can pay for the access right of the application advantageously in connection with the loading by giving his/her credit card number. Thus, the payment is charged through a credit card company. On the other hand, the payment can also be made in cash on delivery, wherein the user makes the payment when he/she claims the access right data sent via mail. It is possible to start using the application after the user has entered the access right data he/she has received. Such data may include, for example, a user identification and a password, a registration code, etc. Advantageously, the access rights contain information on the identification of the user's device or other individualizing information, by means of which different users are prevented from using the same application with the access rights of one user.

As electronic devices are becoming more versatile, a need has arisen to protect certain functions of the electronic devices in such a manner that access to the functions can only be attained through authorized programs. For example, mobile phones have been developed into communication devices suitable for versatile data processing, in which it is also possible to execute programs other than those necessary for implementing phone calls. It is also possible to install new programs in such devices afterwards, and to update already installed programs with newer versions. However, for example mobile phone functions require certain security that not just any program can, for example, determine information stored on the SIM card or make phone calls to the mobile communication network with counterfeit identification data so that another mobile subscriber is charged for the calls. In a corresponding manner, in devices containing for example functions relating to monetary transactions, such as the use of the device as a means of payment, it must be secured that a defective or unauthorized program is not allowed to affect the monetary transactions or to change for example the data on the amount of money stored in the device. Furthermore, the use of some digital recordings in the device may involve limited access rights. For example, the user has subscribed to music, software or other digital recordings and installed them in his/her device. In some cases, the access rights of such digital recordings is limited; for example, the digital recording can only be installed in a given device, the number of times or duration of use of the digital recording may have been limited, or a payment must be made, for example, for each time when the digital recording is used. For situations of the above kind, the software of the device is provided with a protected part in which the necessary safety checkings and functions relating to encoding and decoding are executed. Furthermore, such devices typically contain an operating system which is used e.g. for controlling the functional blocks of the device and for transmission of data between different blocks. An interface is implemented for the transmission of information between the operating system and the protected part. For example, an encrypted message received in the device is transferred to the protected part for decryption, after which the decrypted message can be transferred to the operating system for further processing.

The programs to be executed in the device can be divided into various levels of access rights. The programs can be divided, for example, into such programs which do not have any access right to functions requiring safety, and into such programs which have the possibility to process at least some of the functions requiring safety. Thus, when the program is started, the operating system or the protected part checks the access rights of the programs and prevents or allows the access of the program to certain functions. The act of determining the access rights may be based, for example, on the origin of the program, wherein it is possible to provide, for example, a program produced by the manufacturer of the device with wider access rights than a program produced by a third party. On the other hand, for example the manufacturer of the device can provide a particular program manufacturer with wider authorizations (greater reliability) than others, wherein it is possible to provide programs of more reliable program manufactures with more access rights than programs having a lower or undetermined manufacturer reliability level.

At present, keys for different uses have been stored in many devices. The keys can be used, among other things, to validate information, to check access rights, to authenticate software, and to encrypt and decrypt information. Such keys may have been stored either in such a part of the device to which ordinary software has no access, or the keys have been stored in encrypted format, wherein the program using the key comprises another key for decrypting this key. Thus, this second key must be stored in a memory which is inaccessible by ordinary programs.

One problem in the devices of the above kind is that in the development of new programs or in the further development of existing programs, it should be possible to test the programs in an environment which is as authentic as possible. The program to be tested should also have the necessary keys available. With the tools used for testing the program, such as a debugger program and/or device, it is possible to examine such areas of the device which contain information to be kept secret, such as the above-mentioned keys. Part of this information may be such that its disclosure is not very harmful. However, a part is likely to contain such keys which must remain inaccessible even in a test situation. These keys relate, for example, to various payment applications, the management of access rights to digital recordings (DRM, Digital Rights Management), the transmission of confidential information in encrypted format, and other corresponding functions.

In some arrangements of the prior art, at least all the important keys to be kept secret have been replaced with test keys which are deleted after the use. In this way, the programs can be tested by using these test keys. However, the test keys must be replaced with new keys in the device after the testing has been completed.

SUMMARY OF THE INVENTION

It is an aim of the present invention to provide an improved method and system for the testing of programs in an authentic hardware environment. The invention is based on the idea of defining at least two different security levels for keys to be used in the device, wherein one of these security levels is selected for each key. The first security level is preferably the lower security level and, accordingly, the second security level is the higher security level. In the arrangement of the invention, the keys of the first security level can also be used for testing purposes, whereas the keys of the second security level are replaced with test keys for performing the testing. To put it more precisely, the method according to the present invention is primarily characterized in defining at least two different security levels for keys to be used in the device, examining said security level defined for the key and at least one item of mode data relating to the program, and determining, on the basis of the examination, whether said key is available in the mode indicated in the mode data of the program. The system according to the invention is primarily characterized in that at least two different security levels are defined for keys to be used in the device, wherein the system comprises examining means for examining said security level and at least one item of mode data relating to the program, and determining means for determining whether said key is available in the mode indicated in the mode data of the program. The device according to the invention is primarily characterized in that at least two different security levels are defined for keys to be used in the device, wherein the device comprises examining means for examining said security level and at least one item of mode data relating to the program, and determining means for determining whether said key is available in the mode indicated in the mode data of the program. Furthermore, the storage medium according to the invention is primarily characterized in that at least two different security levels are defined for keys to be used in the device, and that the storage medium also comprises program commands for examining the security level determined for said key and at least one item of mode data relating to the program, and for determining, on the basis of the examination, whether said key is available in the mode indicated in the mode data of the program.

The present invention shows remarkable advantages over solutions of prior art. In the system according to the invention it is possible to test the programs in surroundings and environments that comply with the actual use situation as well as possible. Thus, the likelihood of detecting errors is greater than in solutions of prior art, wherein the finished programs are also more reliable. The security of important keys is also confirmed, because they are not used in the test situation. However, some of the keys can also be used for testing, wherein the need for test keys is smaller than in solutions of prior art.

DESCRIPTION OF THE DRAWINGS

In the following, the invention will be described in more detail with reference to the appended drawings, in which.

DETAILED DESCRIPTION OF THE INVENTION

Figure 3A:
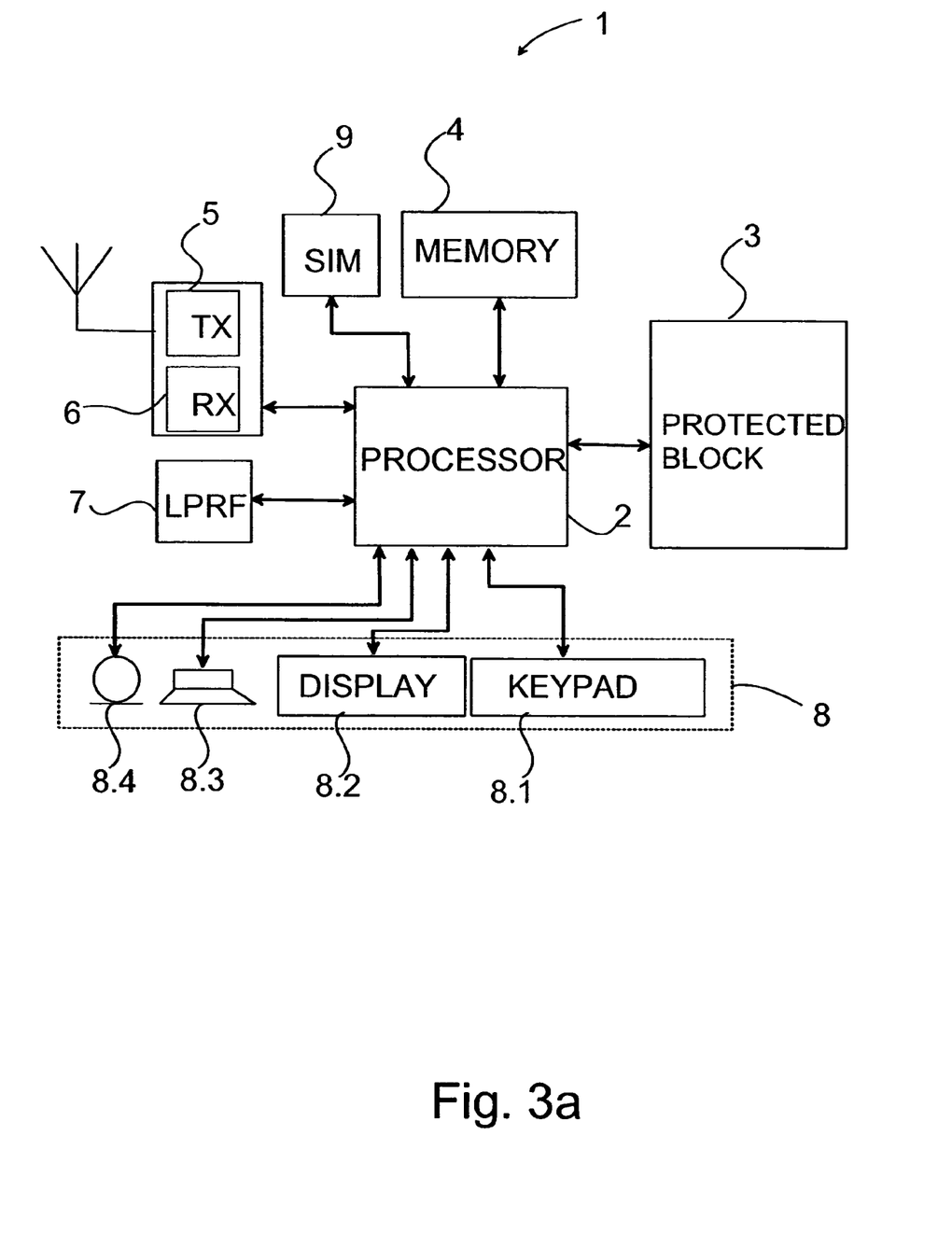
FIG. 3a shows a device according to a preferred embodiment of the invention in a simplified block diagram.
Figure 3B:
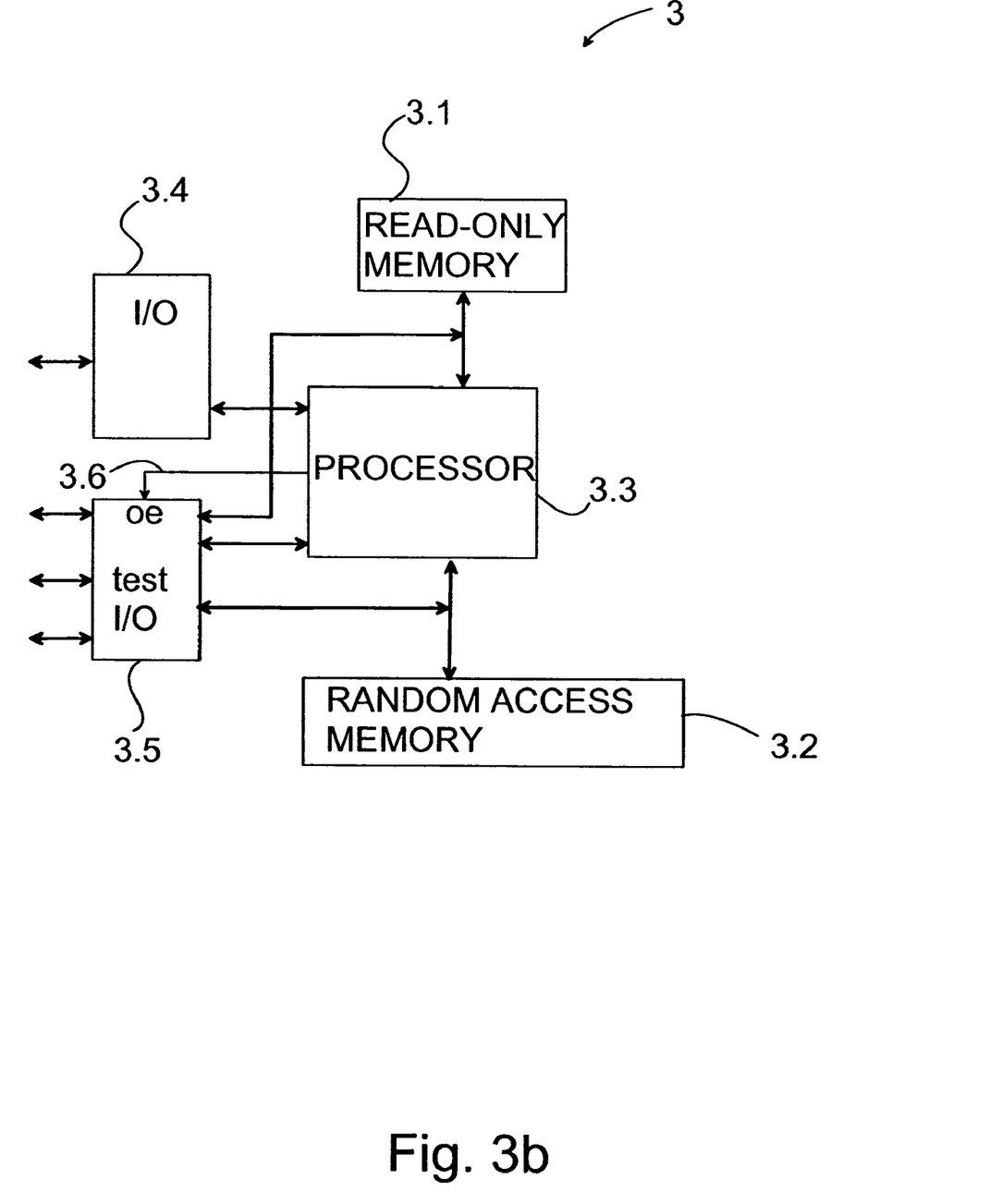
FIG. 3b shows, in a simplified block diagram, a protected block in a device according to an advantageous embodiment of the invention.

In the following, the operation of the method according to an advantageous embodiment of the invention will be described by using the device of FIG. 3a as an example. The device 1 comprises one or several processors 2 for executing programs, performing operating system functions of the device, controlling the operation of different functional blocks of the device, etc. The device also comprises a protected block 3 for processing a majority of such functions whose execution involves operations intended to be secret, such as the processing of secret keys. An example structure of this protected block is shown in FIG. 3b which will be described in more detail below. The device also comprises a memory 4 for storing, for example, software and information necessary for the operation of the device. The device 1 also comprises a transmitter 5 and a receiver 6, by means of which the device 1 can communicate with a communication network. The transmitter 5 and the receiver 6 are preferably intended for wireless communication, wherein the device 1 can be used to communicate with a wireless communication network, such as a mobile communication network (not shown). The device 1 can also contain, for example, local communication means 7 for communicating with other devices (not shown) in the vicinity of the device 1. These local communication means 7 comprise, for example, a transceiver based on low-power radio transmission, such as a Bluetooth transceiver. The operating system 8 of the device advantageously comprises a display 8.2, a keypad 8.1, an earpiece/speaker 8.3 and a microphone 8.4. It should be evident that the device can also comprise more than one user interface. Thus, one user interface may be arranged, for example, primarily for data processing functions, and another user interface may be arranged primarily for mobile phone functions. One example of such a device is the Nokia 9210i Communicator™. Furthermore, the device 1 advantageously contains a user identification card 9, such as SIM (Subscriber Identification Module) and/or USIM (UMTS Subscriber Identification Module), by means of which the user is identified when the device 1 is switched on, and the properties of the mobile station functions granted for the user are determined.

The protected block 3 according to FIG. 3b preferably comprises a read-only memory 3.1, a random access memory 3.2, a processor 3.3, a bus connection 3.4, and a testing connection 3.5. The protected block is preferably formed as a single integrated circuit in such a way that its internal couplings cannot be accessed from the outside. It is thus almost impossible to find out the signals transferred within this protected block. The read-only memory 3.1 contains such stored information and software which do not need to be changed after the manufacture of the device 1. The read-only memory 3.1 contains, for example, the identification of the protected block (chip ID), random numbers to be used for generating some keys, management functions for loading information, management functions for the protected memory, device controllers, etc. The random access memory 3.2 of the protected block is used, for example, for the storing of protected software during the execution as well as for the temporary storing of information which is needed during the execution of the software and which should be kept secret. The function of the processor 3.3 of the protected block is, for example, to execute protected software and to control the bus connection 3.4. Via the bus connection 3.4, information can be transferred between the protected block 3 and the rest of the device 1. When there is no need to transfer information via the interface, the processor 3.3 preferably sets the bus connection 3.4 in such a state that no internal signals of the protected block are transferred to the bus connection. Thus, the internal operation of the protected block cannot be determined even by observing the signals at the interface.

However, it will be evident to those of skill in the art that the device 1 can also be implemented in such a way that the functions of the protected block 3 as well as the other functions are implemented in a single processor. In this case, the read-only memory 3.1, the random access memory 3.2 and the bus connection 3.4 of the protected block are implemented as internal blocks of the processor, and the processor can prevent the monitoring of the signals of the internal bus via the connection pins of the processor when the processor is executing functions of the protected block.

Furthermore, it is possible that the protected block 3 is implemented in a smart card 9 connectable to the device 1, such as a SIM card, or in another appropriate place in connection with the device 1.

Figure 2:
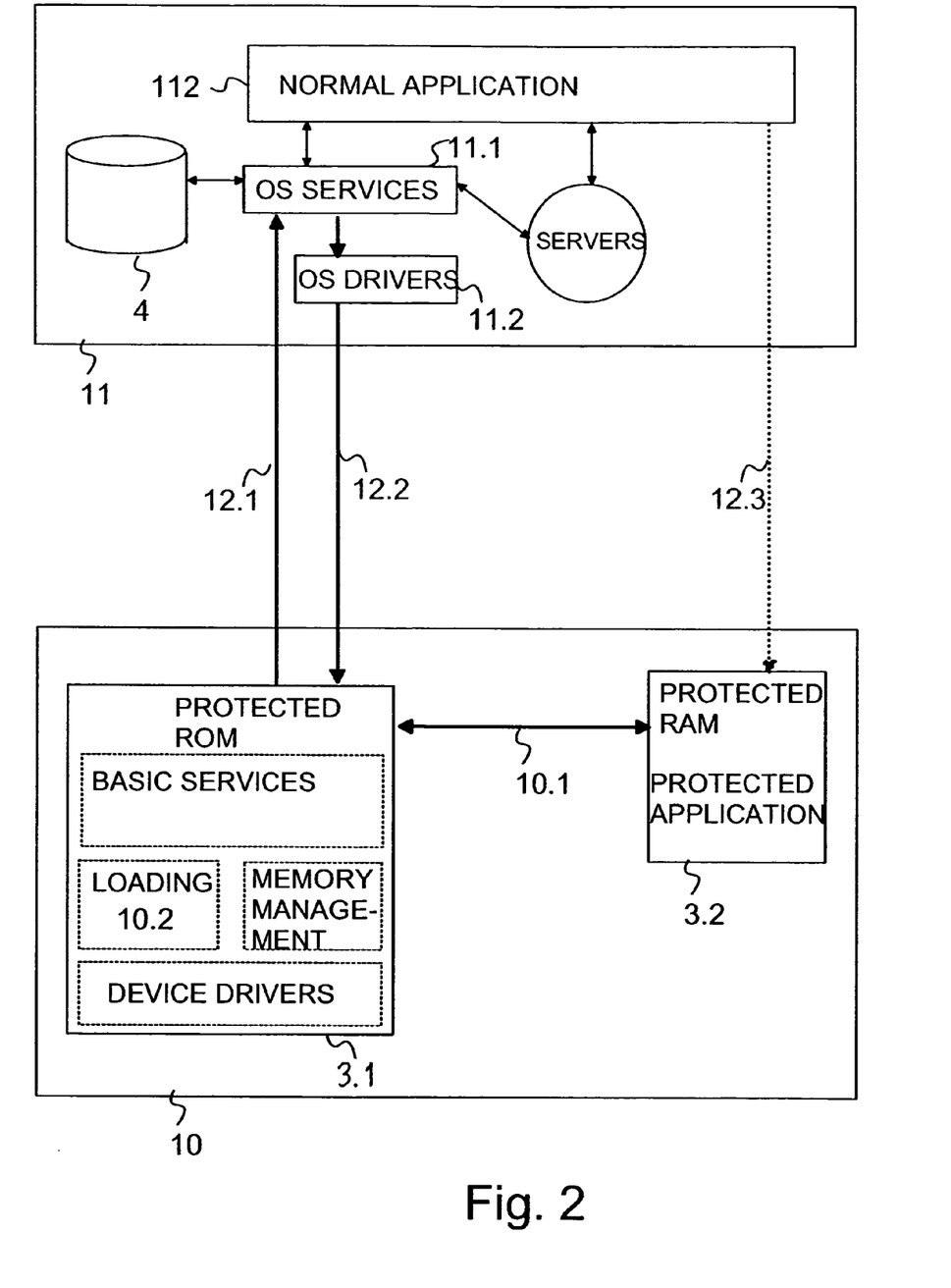
FIG. 2 shows, in a simplified chart, the structure of a software execution environment implemented in a device according to an advantageous embodiment of the invention.

FIG. 2 shows the structure of the software execution environment of the device 1 in a simplified manner. It comprises a protected environment 10 and an unprotected environment 11. The protected environment 10 is implemented in the protected block 3 of the device 1. In a corresponding manner, the unprotected environment 11 is implemented in the other functional blocks of the device, such as the processor 2 and the memory 4. The protected environment comprises a read-only memory 3.1, a random access memory 3.2 and a protected application interface (API) 10.1. arranged therebetween. The protected application relates to such a program which is intended to be executed in a protected environment in such a way that the operation of the program cannot be observed from the outside. Such programs are programs requiring a given security level, such as some programs related to payment transactions, programs intended for the encryption/decryption of information, in which a secret encryption key is handled in unencrypted format, etc.

Preferably, three connections 12.1, 12.2, 12.3 are formed between the protected environment 10 and the unprotected environment 11, implemented on the hardware level by means of the buses (not shown) of the above-mentioned interface 3.4. The first connection 12.1 is intended for subroutine calls from the protected environment, wherein the subroutine to be called is located in the unprotected environment. The subroutines to be called include, for example, operating system services 11.1, such as memory allocation as well as the storage of protected (encrypted) data in a memory 4 outside the protected block. The second connection 12.2 is intended as an application interface from the unprotected environment 11 to the protected environment 10.

This second connection 12.2 can be applied, for example, for using services of the protected environment when there is no need to transfer secret information outside the protected environment. The unprotected environment preferably comprises operating system drivers (OS drivers) 11.2, via which these services can be called. As an example of such services, we shall mention the verification of a digital signature, wherein the digital signature to be verified, and, if necessary, also a public key, are transferred from the unprotected environment 11 to the protected environment 10. The protected environment comprises a program for executing the verification. The third connection 12.3 between the protected environment 10 and the unprotected environment 11 is intended for communication between an ordinary (unprotected) application and a protected application.

Figure 1A:
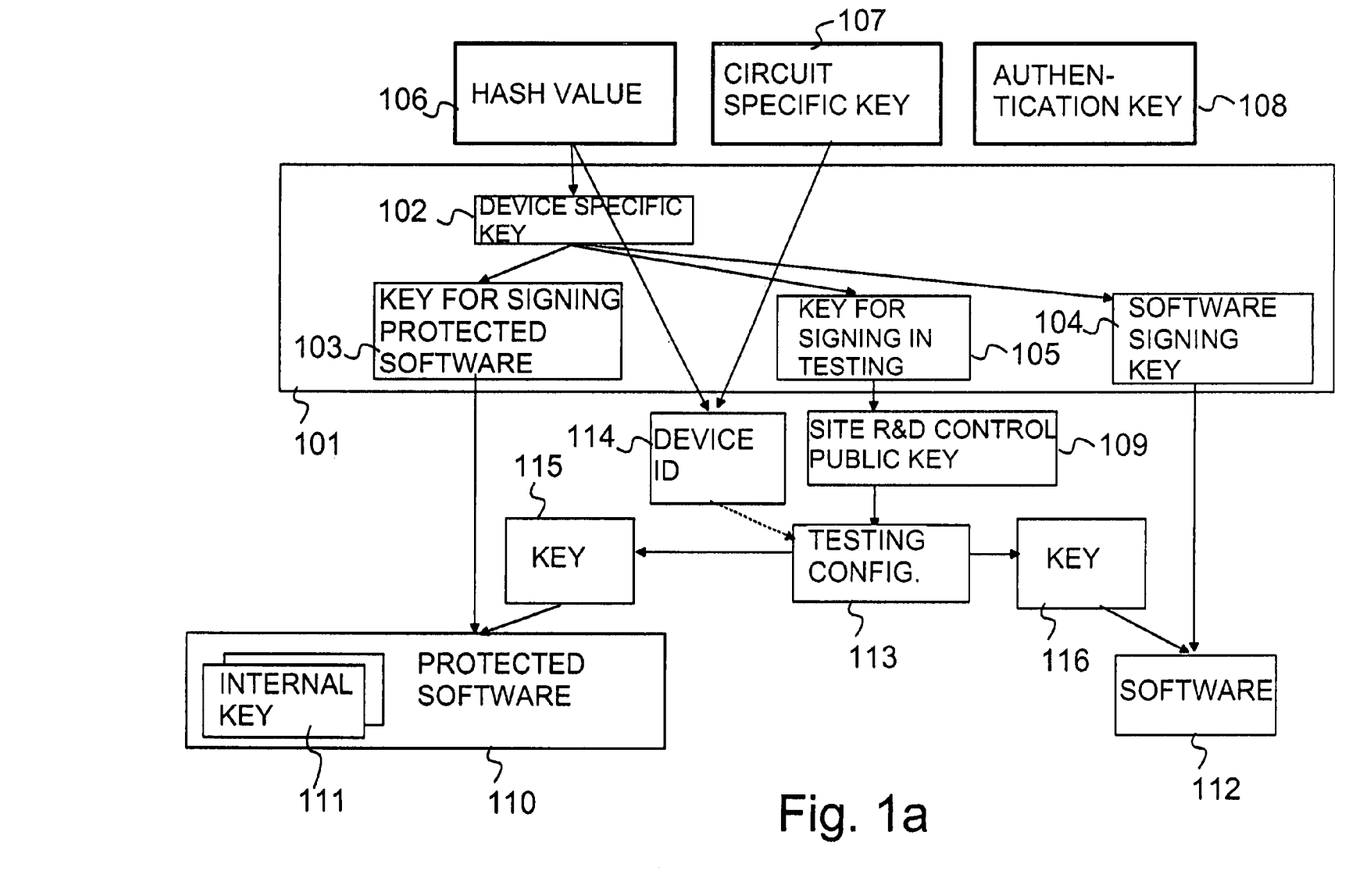
FIGS. 1a and 1b show the key processing hierarchy of a device in a simplified manner.

FIG. 1a shows the key processing hierarchy in a device 1 in a simplified chart. However, it will be obvious that the present example is only one possible embodiment which can be applied in connection with the present invention. In the key processing hierarchy of FIG. 1a, there are a number of public keys which constitute a so-called public key header 101 for the device 1. This public key header 101 contains information about the public keys of the device 1, as well as public keys 102-105. In this context, the public keys include, for example, a device specific key 102 (Chip HW Public Key), a key for signing protected software 103 (Secure Mode Public Key), a software signing key 104 (OEM1 Software Signing Key), and a software testing signing key 105 (OEM2 R&D Control Key). During the use of the device 1, the public keys can be read from the memory 4 and stored in the random access memory 3.2 of the protected environment. In connection with the storage, the data is verified, preferably by means of the device specific key 102. On the other hand, the public keys can be read from the memory 4 into the random access memory 3.2 of the protected environment at the stage when they are needed. Also in this case, the data must be verified.

Furthermore, a hash value 106 counted on the basis of the device specific key 102, a chip specific internal key 107, and an authentication key 108 are stored in the circuit which comprises the protection block. Said hash value 106, chip specific internal key 107 and authentication key 108 are stored in the circuit preferably at the stage of its manufacture, and they cannot be changed afterwards. Also the device specific key 102 is preferably stored in the circuit in connection with the manufacture, and it cannot be changed after the storage. Preferably, keys for testing are also stored in the device. A site R&D control public key 109 is used in connection with testing, which will be described in more detail below in this description.

In addition to the above-presented keys, FIG. 1a also shows other blocks relating to the protection of the device. The device comprises programs 110 which are intended to be executed in the protected environment and whose reliability can be checked by checking the digital signature stored in connection with the programs by using the key for signing protected software 103. Also, public keys 111 intended for the internal use of the programs may have been stored in these programs, wherein these public keys are loaded in the random access memory 3.2 of the protected environment in connection with the loading of the programs. Furthermore, the device comprises programs 112 which are intended to be executed in an unprotected environment and which have been digitally signed with a secret key corresponding to the software signing key 104. A testing configuration 113 contains information about keys 115, 116, which can be used in connection with testing. The testing configuration is digitally signed with a secret key corresponding to the site R&D control public key 109. Also, the individual device identification 114 contained in the device is digitally signed by using a secret key corresponding to the device specific key 102.

In the diagram of FIG. 1*a*, solid arrows indicate the keys which are used for verifying various data (chain of checking the reliability). For example, the device specific key is used for verifying the key for signing protected software 103, the software signing key 104 and the software testing signing key 105. In a corresponding manner, the hash value 106 can be used to verify the validity (integrity) of the device specific key 102.

Also, the public key header 101 is digitally signed to enable the authentication of the data contained in it.

The data which can be checked with the above-described public keys is preferably signed, in a way known as such, with a secret key corresponding to the public key at the stage of manufacture of the device 1 and/or the program. The secret key does not need to be stored in the device or program itself, if the public key corresponding to the secret key is only used for authentication but not for signing or encrypting data.

Figure 1B:
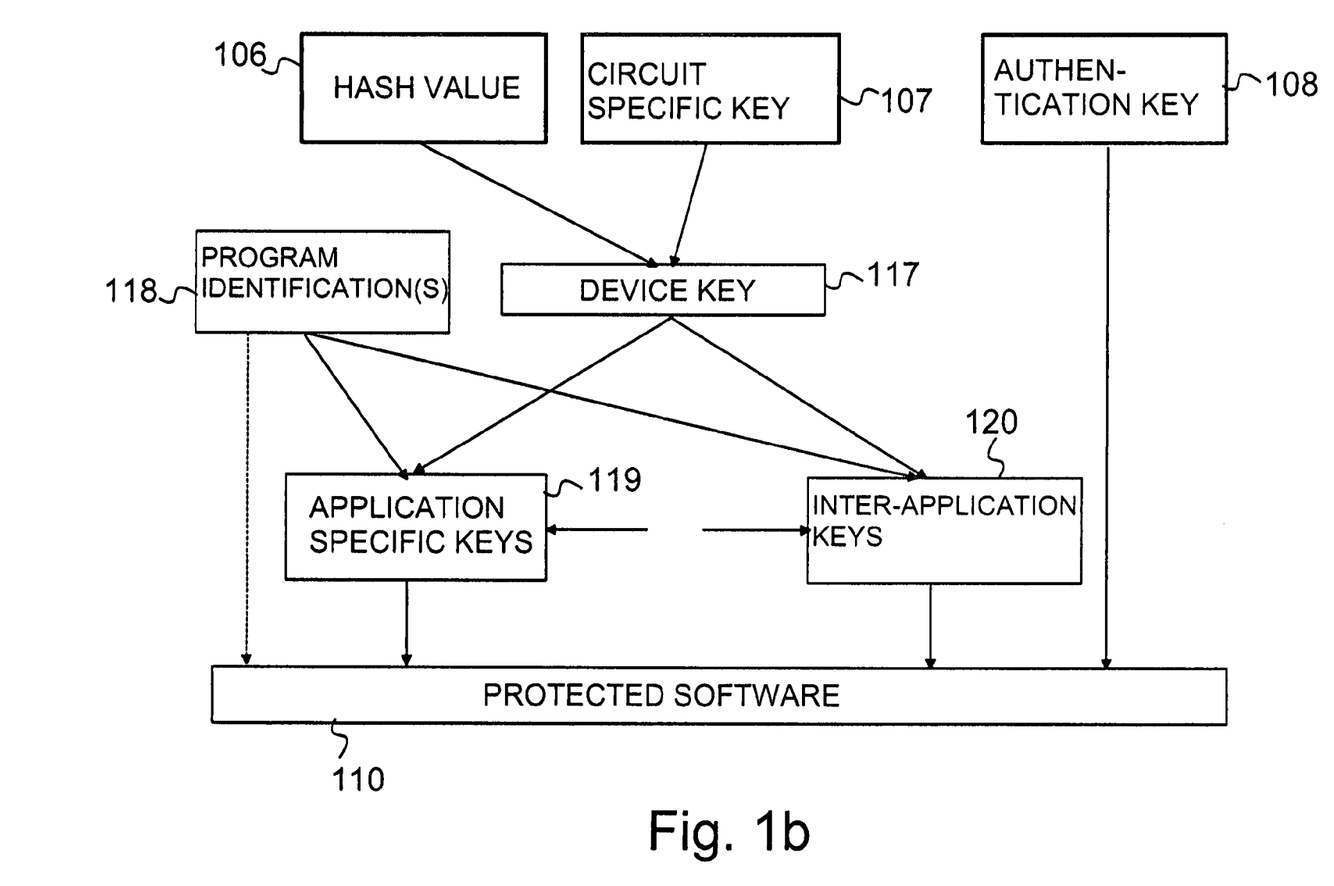

FIG. 1*b* illustrates the key hierarchy of the device 1 with respect to symmetric keys. The use of symmetric keys is based, in a way known as such, on the fact that the same key is used for encrypting or signing data and for decrypting or verifying a signature. Consequently, such a symmetric key must not be disclosed to outsiders. The authentication key 108 can be used for authenticating the circuit, for example, in the protected application 110 which is intended for use in a given device 1 only. The circuit specific internal key 107 is preferably a circuit specific random number and is intended for use to secure the reliability and integrity, when information is stored outside the protected environment. The circuit specific key 111 is formed on the basis of information relating to the circuit, and it should be different for different circuits. Each program 110 which can be executed in the protected environment may involve one or more application specific keys 119 intended for the internal use of the program only. In addition, inter-application keys 120 may be formed for programs, intended to be used in communication between two programs. Such an inter-application key is stored in each program in which it is intended to be used.

Preferably, each program is provided with at least an application originator ID and an application ID to identify each application. These identifications are preferably stored in the application as hash values which have been computed on the basis of the identification by using a secret key. In this way, the authenticity of the hash value can be checked with the public key corresponding to the secret key.

The keys 119, 120 available for the program can be used, for example, for data encryption and decryption, for digital signing of data, for checking the reliability of the digital signature, etc. The program can form several keys from one symmetrical basic key in such a way that the disclosure of the generated key does not risk the secrecy of the basic key. It is thus advantageous that the program does not use the same key for several different purposes but generates different keys for different purposes.

In the solution according to the present invention, the application specific keys 119 and the inter-application keys 120 are provided with information to indicate the availability of the keys for the testing of software, that is, the security level. This security level may be program specific, wherein all the keys used by the program are processed in the same way, or the information may be key specific, wherein different keys can be processed in different ways even within the same program. In the solution according to an advantageous embodiment of the invention, a first security level and a second security level are determined, wherein the first security level is a lower security level and the second security level is a higher security level. For keys intended to be very reliable and to be kept absolutely secret, the set security level is the higher security level; that is, the keys cannot be used in connection with testing. Such a key has a different value in the normal mode and in the test mode. In other cases, the security level is set to be the first security level. Such a key has the same value in both the normal mode and the testing mode. The security level can be indicated, for example, with a value of one bit, which may thus be either 0 or 1. The compiler of the program can store this security level in the program either to cover the whole program or separately for each key.

In the following, we shall describe the use of keys in connection with the testing of software. In connection with turning on the device 1, the authenticity of the operating system stored in the device 1 and to be started is preferably verified. This is done, for example, by checking the digital signature stored in the operating system with the software signing key 104. If the checking indicates that the operating system is authentic, the operating system can be started. In this context, the device 1 is informed of the shift to the testing mode. The testing person preferably uses the interface 8 of the device 1 to indicate which program is to be started for testing. On the basis of this information, the program installation service checks whether access rights have been given for the program. If there are no access rights yet, the program installation service informs an access rights acquisition service about the need to acquire access rights. The access rights are acquired, for example, in the following way. The device 1 sends a message to the server of the device manufacturer (not shown), or the like, containing information on the device 1 in which the testing is to be performed and on the program for which said access rights are to be given. The device information contains at least identification data of the device, such as a device ID, as well as information on the producer of the program to be tested. In the server of the device manufacturer, the device ID is examined from the received message, and on the basis of the same, information on the device 1 and on the producer of the program is retrieved from a database in the server. This information contains, for instance, a device specific key 102, by means of which the data can be encrypted in such a manner that decryption is possible in the device 1 only. The data of the program producer contain information indicating what kind of access rights can be granted for the programs of said producer. These rights can depend, for example, on the agreement between the device manufacturer and the program producer.

If the testing of the program in the device 1 can be allowed, a message to grant the access rights is transmitted to the device 1. In the device 1, the received message to grant the access rights is examined and, if necessary, the authenticity and integrity of the device is verified. The message to grant the access rights advantageously contains at least the following information. The access right parameters (access right vector), containing information on the functions which are allowed to be used by the program. These functions include, for example, functions relating to the handling of the SIM card, certain operating system functions, user interface functions, or the like. Furthermore, the message to grant the access rights contains information on the identification of the program to which said message relates. Thus, the software loading program 10.2 can allocate the possible extensions/restrictions of the access rights to the correct program. At this stage, the access rights given for the program are known, and thus the program can be started and its function can be controlled within the scope of the determined access rights.

For the time of the testing, for example the testing connection 3.5 of the protected block is activated, wherein the connection lines of the testing connection (not shown) can be used to find out signals within the protected block 3. This makes it possible to trace the procedure of programs to be executed in the protected block 3 and to debug them. Preferably, there are at least two testing modes available: a mode for testing normal software and a mode for testing protected software. However, before the activation of the testing mode, it is first checked if testing is allowed in said device 1. This is found out by checking the information about possible test modes contained in the testing configuration 113.

In the mode for testing normal software, the program signing key 104 and the corresponding testing key 116 are used. In the mode for testing protected software, the corresponding testing key 115 is used instead of the key 103 for signing protected software. These testing keys 115, 116 are stored, for example, in the testing configuration 113.

At the stage when the testing of the program is to be started, the following steps are taken in the method according to an advantageous embodiment of the invention. The program to be tested is preferably stored in the normal memory 4 of the device and it is provided with a digital signature. For the digital signature of the program to be tested, the secret key corresponding to the above-mentioned testing key 115, 116 has been used.

When the device 1 is in the testing mode, the loading of the program into the random access memory 3.2 of the protected block is started. The loading program 10.2 is stored in the read-only memory 3.1 of the protected block. The loading program 10.2 verifies the authenticity of the program to be loaded with the the software testing signing key 105 before the program is started. Furthermore, the security level of the keys related to the program is checked. If the security level indicates that a key cannot be used for testing, the test key corresponding to this key is set available for the program for the time of the testing. However, if the security level indicates that the key can also be used for testing, the key can be used normally for the testing as well.

In the arrangement of the above-described kind, the testing person cannot find out the content of such keys whose security level is set to the second value, that is, the higher security level, because these keys are not used as such in the testing situation but a testing key is used instead.

In practical applications, there may be various implementations for testing functions. For example, a normal mode and a testing mode can be defined for the device. Thus, in the testing mode, all the programs operate in the testing mode and all critical keys are replaced with the corresponding test keys. In this embodiment, information about the testing mode is preferably transmitted to all such programs which need to take into account that the keys are kept secret. These programs can replace the keys to be kept secret with test keys.

The testing function can also be implemented in a program specific way, wherein preferably only the program or programs to be tested are set in the test mode. In this case, the other programs can operate in the normal way. Consequently, in this embodiment, the testing of the program does not affect the other programs, wherein in other respects, the device 1 can be used normally, if necessary. In practice, such a program specific testing function can be implemented, for example, in the following way. The protected kernel, or the like, of the operating system, whose operation in critical parts cannot be found out with testing equipment even in a testing situation, examines if the testing of the program intended to be tested is allowed in said device 1. If the testing is allowed, the kernel sets the program to be tested in the test mode. In a corresponding manner, after the testing, the kernel may set the program in the normal mode, or stop the program.

In some cases, in the above-described program specific testing alternative, there may also be a need to inform other programs about a program being in the test mode. This may be necessary, if it is possible that it cannot be guaranteed that secret keys remain secret in the testing situation. Thus, the program in the normal mode can decide whether the keys are replaced with test keys or not.

The testing function can also be implemented in such a way that the program is in the test mode as long as the normal access rights for the program are received or set in the device 1.

The method according to the invention can be largely implemented by software, wherein a set of program commands is generated to perform the functions of the method. These program commands can be stored, in a way known as such, in a storage means, such as a memory 3.1, 4, a CD-ROM, a digital versatile disc, etc.

It is obvious that the present invention is not limited solely to the above-presented embodiments but it can be modified within the scope of the appended claims.

The invention claimed is:

1. A method comprising loading a program into a protected block of a device, said device for carrying out said method by:
   determining a mode data relating to the program,
   determining at least two different security levels for keys to be used in the device,
   forming a first key for use in said program,
   examining a security level determined for said first key and a mode of the program indicated by the mode data relating to the program,
   determining, based on said examining, if said security level determined for said first key is available in the mode of the program indicated by said mode data,
   wherein if the determining indicates that said security level determined for said first key is not available in the mode indicated by said mode data, the method comprises using a second key instead of said first key to perform testing in said device.

2. The method according to claim 1, wherein the first security level is a lower security level and the second security level is a higher security level.

3. The method according to claim 1, wherein said security level is program specific, wherein the method comprises determining the same security level for all keys to be used in the program.

4. The method according to claim 1, wherein said security level is key specific, wherein the method comprises determining the security level for each key to be used in the program, substantially irrespective of the other keys.

5. The method according to claim 1, wherein for a key which cannot be used in connection with the testing, a test key is determined to be used instead of the key during testing.

6. The method according to claim 1, wherein said keys, for which the security level is determined, are keys intended for internal use in the system.

7. The method according to claim 1, wherein at least one of said keys, for which the security level is determined, are keys intended for use in two programs in communication between the programs.

8. The method according to claim 1, wherein said mode data of the program indicates that the program mode is the test mode or the normal mode.

9. The method according to claim 1, wherein the device has at least a normal mode and a test mode, and that the programs are informed of the mode of the device.

10. A system comprising
a program loaded into a memory of a device, said memory coupled to a processor of said device for storing mode data relating to the program, and for storing a first key to be used in said program, and wherein the system is configured to determine at least two different security levels for keys to be used in the device,
an examining element for examining said security levels and the mode data relating to the program, and
a determining element for determining if said first key is available in a mode indicated by said mode data of the program,
wherein the system is configured to use a second key instead of said first key if the determining indicates that a security level determined for said first key is not available in the mode indicated by said mode data to perform testing in said device.

11. The system according to claim 10, wherein the first security level is a lower security level and the second security level is a higher security level.

12. The system according to claim 10, wherein said security level is program specific, wherein the same security level has been determined for all keys to be used in the program.

13. The system according to claim 10, wherein said security level is key specific, wherein the security level has been determined for each key to be used in the program, substantially irrespective of the other keys.

14. The system according to claim 10, wherein for a key which cannot be used in connection with the testing, a test key has been determined to be used instead of the key during testing.

15. A device comprising
a processor coupled to a memory;
a program loaded in the memory of the device, wherein the device is configured
to determine at least one item of mode data relating to the program,
to determine at least two different security levels for keys to be used in the device,
to examine said security level and the mode data relating to the program, and
to determine if said first key is available in the mode indicated by said mode data of the program,
wherein the device is configured to use a second key instead of said first key if the device determines that said security level for said first key is not available in the mode indicated by said mode data to perform testing in said device.

16. A mobile communication device comprising
a processor:
a memory coupled to the processor;
a program loaded in the memory of the mobile communication device with mode data relating to the program,
wherein the mobile communication device is configured
to examine a security level of the program and the mode data relating to the program,
to determine if a first key is available in the mode indicated by said mode data of the program, and
to use a second key instead of said first key if the security level for said first key is not available in the mode indicated by said mode data to perform testing in said device.

17. A computer readable storage medium, in which device program is arranged to be loaded to be executed in the device, said program having mode data relating thereto, and wherein at least two different security levels are determined for keys for use in the device, and that the computer readable storage medium has program commands stored thereon to examine a security level determined for a first key and the mode data relating to the program and, on the basis of the examination, to determine whether said first key is available for use in the mode indicated by said mode data, wherein if the determining indicates that said security level determined for said first key is not available in the mode indicated by said mode data the storage medium also has program commands stored thereon to use a second key instead of said first key to perform said testing in said device.

18. An apparatus configured:
for determining at least one item of mode data relating to a program loaded in a memory of a device;
for determining at least two different security levels for keys to be used in the device,
for examining said security level and the mode data relating to the program, and
for determining if said first key is available in the mode indicated by said mode data of the program,
for using a second key instead of said first key if it is determined that said security level for said first key is not available in the mode indicated by said mode data to perform testing in said device.

* * * * *